(No Model.)
J. B. J. D'ENTREMONT.
TRAWL ROLLER.
No. 490,139. Patented Jan. 17, 1893.
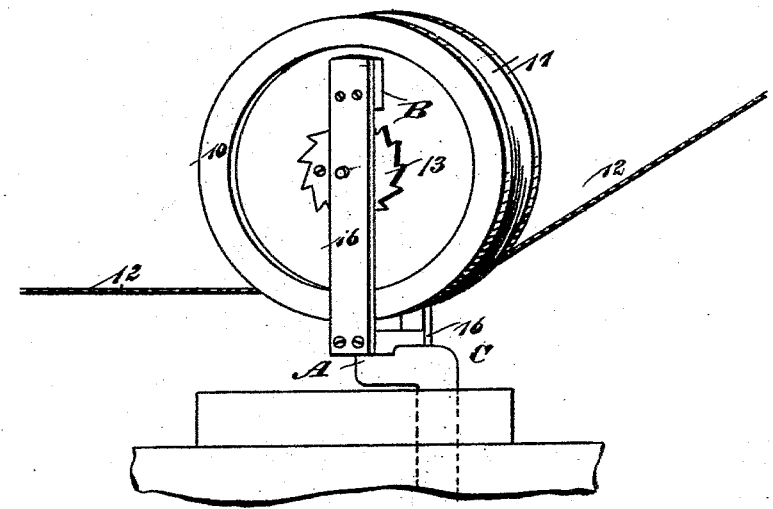
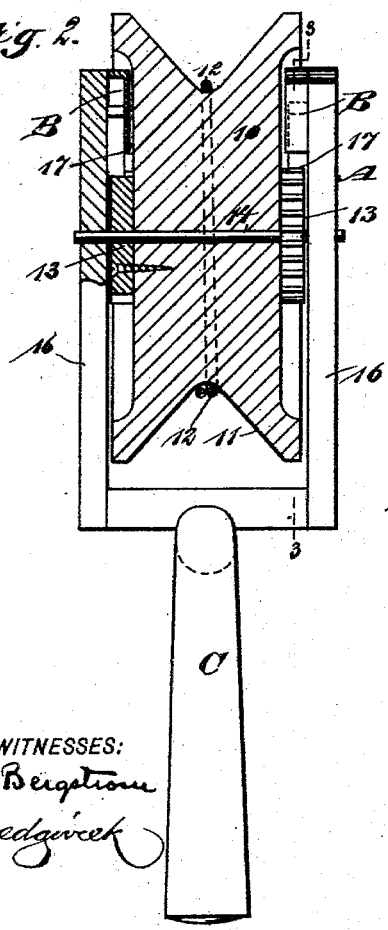
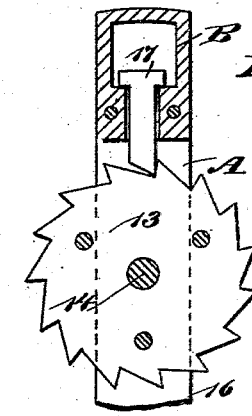
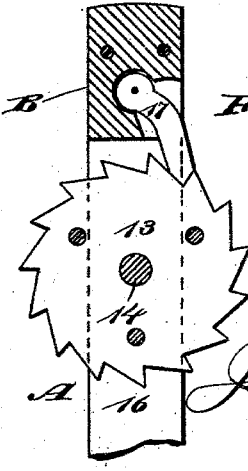
WITNESSES:
J. A. Bergstrom
C. Sedgwick
INVENTOR
J. B. J. D'Entremont
by Munn & Co.
ATTORNEYS.

UNITED STATES PATENT OFFICE.

JOHN B. J. D'ENTREMONT, OF EAST PUBNICO, CANADA.

TRAWL-ROLLER.

SPECIFICATION forming part of Letters Patent No. 490,139, dated January 17, 1893.

Application filed June 28, 1892. Serial No. 438,293. (No model.)

*To all whom it may concern:*

Be it known that I, JOHN B. J. D'ENTREMONT, of East Pubnico, in the county of Yarmouth, Province of Nova Scotia, and Dominion of Canada, have invented a new and useful Improvement in Trawl-Rollers, of which the following is a full, clear, and exact description.

My invention relates to an improvement in trawl rollers, and has for its object to provide the rollers with a brake mechanism whereby the rollers may be readily turned in a direction to admit of the trawl lines being drawn in readily, expeditiously and conveniently and whereby the brake mechanism will automatically act to prevent the roller from turning outward.

Another object of the invention is to provide a brake or check mechanism which will be simple and economic, and also which may be added to any form of trawl roller at but little cost.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the improved trawl roller; Fig. 2 is a section taken vertically through the body of the roller and partially through its yoke; Fig. 3 is a section taken vertically through the axle of the roller and through the box in which the brake mechanism is located, the section being taken practically on the line 3—3 of Fig. 2; and Fig. 4 is a detail sectional view similar to that illustrated in Fig. 3, but illustrating a slight modification in the construction of the brake mechanism.

The roller 10, may be of any desired size, and may be made of any approved material. Preferably the roller is made from a hard wood, and it is provided with the usual peripheral groove or channel 11, the groove or channel being adapted for the reception of a line 12 when the roller is used in trawl fishing.

Ratchet wheels 13, are secured to the side faces of the roller, one ratchet wheel being located at each side, and the side faces of the roller are depressed to such an extent that when the ratchet wheels are secured thereto the outer faces of the ratchet wheels will be flush, or practically flush, with the outer marginal side surfaces of the roller. The ratchet wheels may be secured to the roller in any approved manner, or may constitute integral portions thereof.

The extremities of the axle 14 of the roller are journaled in members 16 of a yoke A, and each member of the yoke, at what may be termed its outer or upper end, has a box B, attached to its inner face, and in each box a pawl or detent 17, is located, which may have sliding movement in its box, as shown in Fig. 3; or the pawl or detent may be pivoted in its box, as shown in Fig. 4. When the pawl or detent has sliding motion it is preferably made straight, and the lower ends of the pawls or detents are beveled; and when the pawls are pivotally located in their boxes, having rocking motion therein, they are more or less curved, and are provided with heads whereby they are pivoted. In either event the pawls or detents operate automatically by gravitation. The pawls are normally in engagement with the ratchet wheels, and the wheels may readily turn in one direction but are prevented from turning in any other direction; consequently the roller will turn only in one direction and that is in a direction to admit of the line A, passed over the roller, being drawn inward. The inner end of the yoke has secured thereto a handle C, which is preferably made somewhat L-shaped, as shown in Fig. 1, the shorter member of the handle being secured to the yoke.

In operation, the roller is placed in a vertical position, its handle being introduced into an opening formed in a cleat attached to the gunwale of the dory or other boat used in fishing; or the openings to receive the handle of the roller may be produced in any portion of the boat that in practice may be found most desirable. When the roller has been placed in this position, and it is desired to draw in the trawl, the line is brought inboard in the groove over the roller which turns always inward, and the check or pawl prevents it from turning outward helping the man that hauls the trawl to hold it with ease when a heavy strain comes from outside, such as the trawl hooked to the bottom of the dory rising on a wave, which without the check would be impossible to hold from rolling back.

Having thus described my invention, I claim as new, and desire to secure by Letters Patent,—

1. In a trawl roller, the combination with a yoke, of a grooved roller mounted in the yoke and having its sides recessed, ratchet wheels in the recessed sides of the roller, boxes on the inner sides of the upper ends of the members of the yoke, and gravity pawls in said boxes, substantially as described.

2. The herein described trawl roller, consisting of the yoke A provided with the handle C, the roller 10 mounted in the upper ends of the members 16 of the yoke and having recessed sides, ratchet wheels in the recessed sides of the roller, the boxes B on the inside of the upper ends of the members of the yoke, and the sliding pawls 17 in said boxes and engaging the ratchet wheels, as specified.

JOHN B. J. D'ENTREMONT.

Witnesses:
P. S. D'ENTREMONT,
J. A. D'ENTREMONT.